United States Patent [19]

Jacobsson

[11] 4,058,169
[45] Nov. 15, 1977

[54] AUTOMATICALLY SELF-STEERING PLOW/HARROW COMBINATION WITH RELEASE AND RESET MECHANISM CONNECTING HARROW TO PLOW

[76] Inventor: Lars-Eric Jacobsson, Galtungs Burs, Stanga, Sweden, S-620 13

[21] Appl. No.: 658,110

[22] Filed: Feb. 13, 1976

[30] Foreign Application Priority Data

Feb. 18, 1975 Sweden ............................. 7501816

[51] Int. Cl.² ........................................ A01B 49/02
[52] U.S. Cl. .............................. 172/191; 172/203; 172/265; 172/269
[58] Field of Search ............. 172/191, 193, 194, 198, 172/201, 202, 203, 261, 264, 265, 269, 691, 693, 694, 705, 710, 711

[56] References Cited

U.S. PATENT DOCUMENTS

| 292,272 | 1/1884 | Wood | 172/203 |
|---|---|---|---|
| 453,108 | 5/1891 | Creighton et al. | 172/203 |
| 604,274 | 5/1898 | Sperry | 172/203 |
| 1,076,520 | 10/1913 | Rohrer | 172/203 |
| 1,581,395 | 4/1926 | Danskin | 172/203 |
| 1,587,081 | 6/1926 | Martinson | 172/203 |
| 2,568,572 | 9/1951 | Van Zee | 172/202 |
| 3,574,320 | 4/1971 | Sigmund | 172/202 |

Primary Examiner—Richard T. Stouffer
Attorney, Agent, or Firm—Holman & Stern

[57] ABSTRACT

A plow/harrow combination comprising a harrow member extending sidewardly from a plow blade, the harrow teeth having an elongated cross section with the cross-sectional length axis inclined in relationship to the direction of travel, thus creating a compensating force on the plow blade, the combination also including a release and reset mechanism, which, when the harrow member is obstructed by an object creating a load exceeding a predetermined level, causes the release of the harrow member from the original position and a pivoting movement of same in a substantially horizontal plane, the harrow member being automatically returned to the original position as soon as the load on the harrow member no longer exceeds the predetermined load.

6 Claims, 3 Drawing Figures

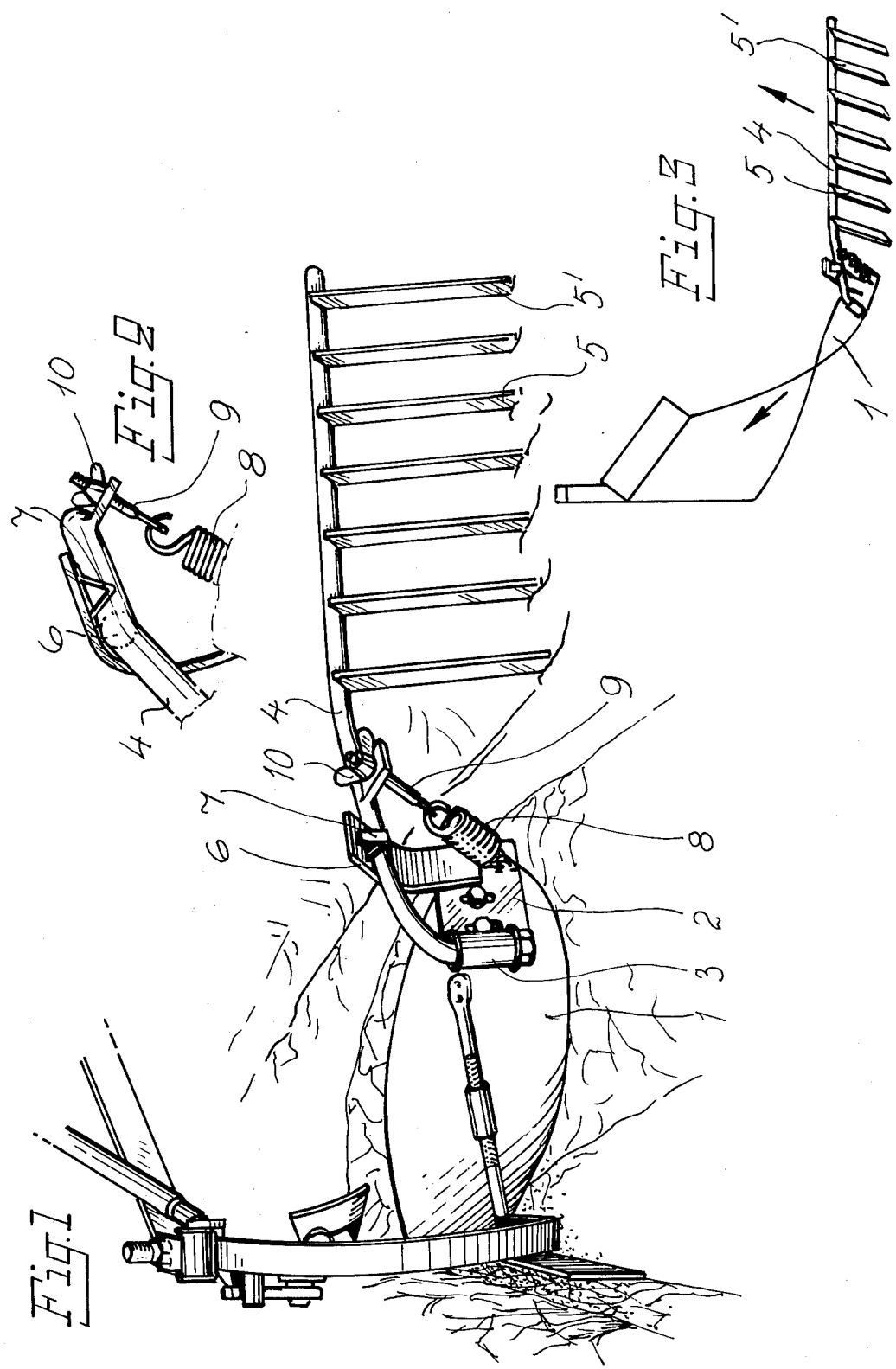

AUTOMATICALLY SELF-STEERING PLOW/HARROW COMBINATION WITH RELEASE AND RESET MECHANISM CONNECTING HARROW TO PLOW

BACKGROUND OF THE INVENTION

The present invention relates to an automatically self-steering plow/harrow combination and in particular to a harrow device arranged to be used in combination with a conventional plow, thus forming the aforementioned plow/harrow combination.

Combinations of plows and harrows are previously known, e.g. by Swedish Pat. No. 316,042 and U.S. Pats. Nos. 3,574,320; 2,568,572 and 2,951,546. The aforementioned patents dislose a harrow device attached to, or adjacent to, a plow blade. A combination of a plow and a harrow has obvious advantages, since the soil can be subjected to a light harrowing operation in connection with the plowing operation. As a result, the plow ridges are levelled, thus resulting in a faster and more even evaporation of moisture from the soil and better conditions for seeding, which creates a more even crop. By carrying out plowing and light harrowing in one operation, the creation of wheel tracks from the tractor is also avoided, a fact of great importance, since water can remain for a considerable time in the wheel tracks, thus preventing the desired even evaporation of moisture from the soil. Previously known combinations of plows and harrows consist of a harrow device attached to, or adjacent to, a plow blade. The harrow device is a conventionally shaped harrow, comprising a number of harrow teeth, directed towards the ground plane and spaced from each other, preferably having a circular cross/section. In the previously known types of harrow devices, the harrow teeth are arranged pivoting, or springacting, in a plane corresponding to the direction of travel for the plow.

SUMMARY OF THE INVENTION

The object of the present invention is to provide a novel plow/harrow combination, having a previously unknown self-steering effect. When plowing, considerable transversely directed forces act on the plow blade, which are totally counteracted or compensated for by the harrow device, according to the present invention. This fact also improves the harrowing effect desired with this type of combination. The harrow device, according to the present invention, is also arranged to allow for simple adjustment of the depth of the harrow teeth in relation to the ground plane. A novel automatic release device to protect the harrow device is also included in the combination according to the present invention. The release device can be arranged to release at a predetermined force, e.g. to release for large stones, and to reset the harrow device under the influence of a predetermined force back to the harrowing position, when the release device has been forced to release. The adjustment of the release and reset force is also carried out in a simple and quick manner. The harrow device, according to the present invention, is also arranged to allow for fast and simple attachment to common types of plow blades on the market.

BRIEF DESCRIPTION OF THE DRAWINGS

An embodiment of a plow/harrow combination, according to the present invention, is more fully described below with reference being made to the accompanying drawing in which:

FIG. 1 is a perspective view of a plow/harrow combination, according to the present invention, joined together by means of a bolt connection;

FIG. 2 is a detail view of the release and reset device for the harrow member; and FIG. 3 is a schematical view, showing the transverse force on the plow blade in relation to the direction of travel, and the self-steering compensating effect created by means of the harrow member.

DETAILED DESCRIPTION OF PREFERRED EMBODIMENT

By reference numeral 1 is indicated a conventional plow blade. As previously known, the plow can be arranged with only one or several plow blades 1, attached to a frame structure in a predetermined spaced relationship. In the commonly used types of plows, two holes are arranged at the outer portion of each plow blade 1, to allow for attachment of various types of accessories. According to the present invention, the two holes are utilized for attachment of an attachment plate 2 by means of a bolt connection. The bolts extend through the attachment plate through two elongated vertical slots, which allow for an adjustment operation of the height of the attachment plate 2 in relation to the ground plane. A sleeve-shaped part 3 is fixed to one edge portion of the attachment plate 2 and acts as a means for pivoting attachment of a base structure 4, extending outwardly from the plow blade 1. The base structure 4, has a number of harrow teeth 5, 5' with a rectangular cross section, spaced at a predetermined distance from each other and directed towards the ground plane. The harrow teeth 5, 5' are attached to the base structure 4 in such a way, that the facing side planes are parallel to each other, but inclined to the direction of travel for the plow blade 1 and the harrow teeth 5, 5'. The inclination is adjusted in such a way, that the harrow teeth 5, 5' create a transversely directed force on the plow blade 1 during a forward movement, the force being directed in an opposed relationship to the force directed from the direction of travel for the plow blade 1, which is created during plowing with the plow blade 1. A release member, formed by a resilient member 6 attached to the attachment plate 2, with means of engagement 7 for the base structure 4, form in combination with a helicoid spring member 8 a means to automatically allow the base structure 4 with the harrow teeth 5, 5' to pivot away, respectively return to the original position, when one or a number of harrow teeth 5, 5' hit an object, e.g. a large stone. The resilient member 6 together with the means of engagement 7 are then resiliently moved away from the base structure 4. The release force can be predetermined and adjusted, since the resilient member 6 has a through slot, through which a bolt connection extends at the point of attachment for the resilient member 6 to the attachment plate 2. The resilient member 6 can thus be moved in a direction from and to the ground plane respectively. The engagement force acting on the base structure 4 can thereby be adjusted and predetermined, since the spring member 8 is joined to the base structure 4 by means of a threaded member 9, which can be adjusted by means of a wing nut 10.

As shown in FIG. 1, the base structure 4 is in contact with the resilient member 6 during a plowing and harrowing operation. The base structure is held in position partly by the engagement means 7 extending in a direction from the resilient member 6 towards the base structure 4 and partly by the resilient force from the spring member 8. The inclined harrow teeth 5, 5' create a transversely directed force opposed to the transversely directed force created by the plow blade 1, which can easily be understood when examining FIG. 3. By combining the effects of the angle of inclination for the harrow teeth 5, 5' and their rectangular extension with the effects of the depth of the harrow teeth 5, 5' below the ground plane, a compensation of the transversely directed forces is achieved. A novel self-steering effect is hereby achieved, previously unknown in this connection.

The advantages of the force compensation in the plow/harrow combination, according to the present invention are obvious. The plow blade 1 is guided in an improved manner and, more importantly a considerably higher speed in a combined plowing/harrowing operation can be used than what has been possible with previously known types of combinations for this purpose.

When the harrow means 4, 5, 5' makes contact with a large object, the locking mechanism for the harrow means 4, 5, 5' is automatically released, and the harrow means 4, 5, 5' pivots away in a mainly horizontal plane. The spring member 8 will now try to force the harrow means 4, 5, 5' back to the original position, which takes place automatically as soon as the resistance against the harrow means 4, 5, 5' is less than the return force of the spring member 8. The harrowing operation, in combination with the plowing operation, is thus completely automatically restored after release.

Since the attachment plate 2, as well as the resilient member 6, can be easily adjusted to a predetermined position, the force acting against the plow blade 1 as well as the release force, can be easily adjusted. Also the return force necessary for returning the harrow means 4, 5, 5' to the original position from the release position, can be easily adjusted by means of the wing nut 10.

The combination, according to the present invention, can obviously be modified in a number of ways and many other embodiments are possible within the scope of the invention. In particular, the means of attachment and release can be designed in many other ways, even though the important and characteristic features of the invention are maintained.

It has also been stated with reference to the embodiment shown and described, that the harrow teeth 5, 5' are arranged with a rectangular cross/section. Such a cross/section is from a manufacturing point of view advantageous, but other cross/sections can also be used, maintaining the important and characteristic steering effect in connection with a plow blade 1.

The present invention is therefore in no way restricted to the embodiment shown and described, since many other embodiments are possible within the scope of the invention and the following claims.

I claim:

1. A self-steering plow/harrow combination comprising: a plow blade; a longitudinally extending base structure; a number of harrow teeth attached to the base structure and spaced from each other and each directed downwardly towards the ground plane, the harrow teeth having a mainly rectangular cross section with the cross-sectional length axis inclined in relation to the direction of travel for the harrow teeth; the base structure being attached to the plow blade by pivot means restricting movement of said base structure to movement about a vertical pivot, whereby the base structure is movable in a horizontal plane substantially parallel to the ground plane, said base structure being attached to the plow blade in such a way, that the base structure together with the harrow teeth creates a force opposed to the friction force acting on the plow blade; a release mechanism attached to the plow blade and having means to engage the base structure, the engagement means releasing the base structure for movement in said horizontal plane at a predetermined load; and a reset means attached to the plow blade and the base structure to return the base structure to its original position when the predetermined load is no longer exceeded.

2. The plow/harrow combination according to claim 1, further comprising adjustment means for adjusting the harrow teeth in a vertical direction in relation to the plow blade and thereby the force acting on the plow blade from the inclined harrow teeth.

3. The plow/harrow combination according to claim 1, wherein the release mechanism comprises a mainly angleshaped resilient member with an outwardly directed engagement means and means to adjust the position of the release mechanism in relation to the base structure, whereby the contact and release force are adjustable to a predetermined force.

4. The plow/harrow combination according to claim 1, wherein the reset means comprises a spring member having one end portion attached adjacent to the plow blade and the other end portion attached to the base structure by means of an adjustable member to allow adjustment to a predetermined reset force.

5. The plow/harrow combination according to claim 3, wherein the base structure is attached to the plow blade by means of an attachment plate, attached to the plow blade by means of interconnecting bolts and a sleeve-shaped part fixed to the attachment plate and pivotably attached to the base structure.

6. The plow/harrow combination according to claim 5, wherein the attachment plate is provided with elongated vertical through slots through which the interconnecting bolts extend, whereby the attachment plate with the base structure and the harrow teeth can be adjusted in relation to the ground plane.

* * * * *